United States Patent [19]
Wulff et al.

[11] Patent Number: 5,260,418
[45] Date of Patent: Nov. 9, 1993

[54] WASHING OF POLYCARBONATES WITH CASCADING TRAIN OF CENTRIFUGES

[75] Inventors: Claus Wulff; Jürgen Heuser, both of Krefeld; Günther Weymans, Leverkusen, all of Fed. Rep. of Germany

[73] Assignee: Bayer Aktiengesellschaft, Leverkusen, Fed. Rep. of Germany

[21] Appl. No.: 977,488

[22] Filed: Nov. 17, 1992

[30] Foreign Application Priority Data
Nov. 26, 1991 [DE] Fed. Rep. of Germany ....... 4138754

[51] Int. Cl.$^5$ ............................................. C08G 64/40
[52] U.S. Cl. ..................... 528/502; 528/196; 528/198; 528/490; 528/499
[58] Field of Search ............... 528/502, 490, 499, 196, 528/198

[56] References Cited
U.S. PATENT DOCUMENTS

| 4,323,519 | 4/1982 | Mori et al. | 528/499 |
| 4,845,193 | 7/1989 | Umemura et al. | 528/502 |

FOREIGN PATENT DOCUMENTS

| 8510013 | 6/1987 | China . |
| 264885 | 4/1988 | European Pat. Off. . |
| 1-096212 | 4/1989 | Japan . |

OTHER PUBLICATIONS

CA 106(20): 158460s.
Abstract-JP 1096212.

*Primary Examiner*—Harold D. Anderson
*Attorney, Agent, or Firm*—Joseph C. Gil; Aron Preis

[57] ABSTRACT

A continuous process for the removal of electrolytes and catalysts from organic polycarbonate solutions is disclosed. Accordingly, a solution obtained in the course of the two-phase interfacial reaction for the preparation of polycarbonate, containing thermoplastic aromatic polycarbonate and an organic solvent and up to 10 parts by weight water as well as residues of chain terminators, branching agents and diphenols is washed with water and/or hydrochloric acid through a cascading train of centrifuges. The resulting polycarbonate resin is characteristically of extremely low iron content.

6 Claims, No Drawings

WASHING OF POLYCARBONATES WITH CASCADING TRAIN OF CENTRIFUGES

FIELD OF THE INVENTION

The invention relates to polycarbonate resins and to their manufacture by the two phase interfacial process, and more particularly to the washing of the organic phase to remove electrolytes and catalysts therefrom.

SUMMARY OF THE INVENTION

A continuous process for the removal of electrolytes and catalysts from organic polycarbonate solutions is disclosed. Accordingly, a solution obtained in the course of the two-phase interfacial reaction for the preparation of polycarbonate, containing thermoplastic aromatic polycarbonate and an organic solvent and up to 10 parts by weight water as well as residues of chain terminators, branching agents and diphenols is washed with water and/or hydrochloric acid through a cascading train of centrifuges. The resulting polycarbonate resin is characteristically of extremely low iron content.

DESCRIPTION OF THE PRIOR ART

Polycarbonates produced from diphenolates and phosgene by the two-phase interfacial process are present - dissolved in the organic phase - in an emulsion of aqueous and organic phase. After phase separation, the organic phase is washed before further treatment. The object of washing is to remove catalysts, residues of chain terminators, branching agents and diphenols and also electrolytes, such as sodium chloride for example.

In the prior art, acids, such as for example hydrochloric acid and phosphoric acid, are used as extractants to remove the catalyst. Efficient washing with minimal outlay on equipment is of considerable advantage, particularly for a continuous polycarbonate plant. Hitherto known washing processes using hydrochloric acid often led to problems of corrosion after prolonged operation and hence to considerably high washing costs and to problems of maintenance and limited availability. In addition, corrosion can give rise to a relatively high iron content in the polycarbonate.

The present invention enables organic polycarbonate solutions to be washed particularly efficiently using hydrochloric acid without any problems of corrosion. The polycarbonates have extremely low iron contents. (The iron content is measured with a Contron ES 750 inductively coupled plasma spectrometer (cf. also DOS 3,706,205).

DETAILED DESCRIPTION OF THE INVENTION

The present invention relates to a continuous process for the removal of electrolytes and catalysts from organic polycarbonate solutions by means of a cascade containing a plurality of centrifuges, and using hydrochloric acid and water. In addition to electrolytes and catalysts the solution in accordance with the invention contains a) 3 to 25 parts of a thermoplastic polycarbonate,
b) 97 to 75 parts of an organic solvent which completely dissolves the polycarbonate in these quantities, and
c) up to 10 parts of water of reaction from the two-phase interfacial reaction having a pH value of 5 to 15,
d) and residues of chain terminators, branching agents, diphenol, said parts are by weight and the total of a), b) and c) adds up to 100 parts by weight.

In accordance with the process of the invention the organic polycarbonate solution is processed as follows:

1. introducing the solution into the first centrifuge, Z1, in a cascading train of centrifuges and separating the solution by centrifugation into a organic solution and and aqueous phase and removing the thus separated aqueous phase (pH value of 9 to 13) as the outflow of Z1, and 2. introducing said organic solution flowingly to a next centrifuge, Z2, in said train and washing the solution with hydrochloric acid having a concentration of 0.01 to 2 weight-%, the amount of acid used in this wash is that amount which causes the resulting Z2 wastewater to have a pH value of about 0.5 to 3, and separating the thus washed organic solution by centrifugation and removing said Z2 wastewater as the outflow of Z2, and 3. introducing the thus separated washed organic Z2 solution and added water to the next centrifuge, Z3, and washing said Z2 solution and separating the thus washed Z2 solution by centrifugation, said added water being added in such amount that, as a result of 2 above, the wastewater of said Z3 has a pH value of 2.0 to 5.5, and removing said wastewater of said Z3 as an outflow of centrifuge Z3.

Optionally the separating in 1 above may be carried out with the addition of water and/or aqueous sodium hydroxide solution.

A centrifuge to which water is added may optionally be interposed between steps 1 and 2. The process of the invention entails up to six centrifuges. Water is introduced into any centrifuges past Z3.

The polycarbonate suitable in the context of the present invention is prepared by the two-phase interfacial process from art-recognized diphenols and is characterized in having a molecular weight Mw (weight average, as determined by gel permeation chromatography after calibration) of 15,000 g/mol to 250,000 g/mol. Suitable polycarbonates are polycarbonates based on known diphenols having the molecular weights mentioned above. Diphenols are, for example, those described in U.S. Pat. Nos. 3,028,365, 2,999,835, 3,148,172, 3,275,601, 2,991,273, 3,271,367, 3,062,781 and 2,970,131, in DE-OS 1,570,703, 2,063,050, 2,063,052 and 2,211,956, in FR-PS 1,561,518 and in DE-OS 3,833,953 (Le A 26 397), preferably 2,2-bis-(4-hydroxyphenyl)-propane ("bisphenol A"), 2,2-bis-(3,5-dimethyl-4-hydroxyphenyl)-propane ("TMBPA"), 1,1-bis(4-hydroxyphenyl)cyclohexane ("bisphenol Z") and 1,1-bis(4-hydroxyphenyl)-3,3,5-trimethyl cyclohexane ("HIP bisphenol").

The polycarbonates have known chain terminators such as, for example, phenol, p-tert. butylphenol, cumylphenol, isooctylphenol and isononylphenol.

Suitable branching agents for the polycarbonates are the known types which are used in the synthesis of polycarbonates.

Electrolytes are, for example, NaCl, $Na_2CO_3$, NAOH.

Suitable organic solvents include, in particular, methylene chloride, monochlorobenzene and mixtures of methylene chloride and monochlorobenzene. The organic solvent may also contain residues of non-solvents, such as n-heptane for example. In addition to methylene chloride, mixtures of 30 to 80 parts by weight methylene chloride and 70 to 20 parts by weight monochlorobenzene are preferred, mixtures of 35 to 60 parts by weight methylene chloride and 65 to 40 parts by weight monochlorobenzene being particularly preferred.

Catalysts are the known catalysts suitable for the two-phase interfacial reaction, more particularly tertiary amines, such as for example triethylamine and N-ethyl piperidine.

The polycarbonates may be both homopolymers and also statistical or block copolymers. They may also be present in the form of a mixture of different polycarbonates and have the molecular non-uniformities typical of the two phase interfacial reaction. Other particularly suitable polycarbonates are those which, isolated from their solvents, have a high melt viscosity or a particularly small content of oligomers, for example a small content of reaction products of 2 mol chain terminator with 1 mol phosgene (monocarbonate).

The polycarbonates are produced from phosgene and the diphenols by the known two-phase interfacial process and, after separation of the organic and aqueous phase, are present in the organic solvent for washing of the polycarbonates in accordance with the invention. The two-phase interfacial reaction may be carried out both continuously and in batches, so that the solution to be washed can be continuously introduced into the following wash through a buffer tank of adequate dimensions. If phase separation is not quite complete, the inflowing organic solution may still contain up to 10 parts residual water from the two-phase interfacial reaction with the secondary and added products present therein, more particularly chain terminator, sodium hydroxide and diphenolates.

The centrifuges suitable in the process of the invention are equipped with a mixing head. Centrifuges such as these with a sufficiently corrosion resistant interior are known and are commercially available, for example, from the WESTFALIA company in Germany. Suitable materials for the interior of the centrifuge are, in particular, 1.4571, 1.4439, 1.4529 (Avesta 254SMO), Inconel 625 and also Hastalloy C4. acid concentrations of no more than 5%.

The amount of water introduced into the first centrifuge Z1 depends on the quantity of polycarbonate solution flowing in and the quantity of residual water in the organic phase. pH values of 9 to 13 should generally be maintained in the outflow of the first centrifuge.

Hydrochloric acid is added in very dilute concentrations either to the mixing head of the centrifuge or via a static mixer or a tank equipped with a stirrer (stirred tank) in the product inflow.

The concentration of the acid is between 0.01 and 2 weight-%, preferably below 1 weight-% and, more preferably, around 0,5 weight-%. Higher concentrations require the use of higher grade materials, such as for example Hastalloy C4 or Inconel 625.

The quantity of hydrochloric acid to be introduced is determined by its concentration and by the quantity of inflowing polycarbonate solution. In general, the quantities are always selected so that a water-in-oil emulsion is always formed in the mixing head of the centrifuge, i.e. the aqueous phase is dispersed in the organic phase, and a pH value of 0,5 to 3 is maintained in the outflow of the centrifuge.

In cases where only hydrochloric acid of relatively high concentration is present, it is diluted with water in known manner to the relatively low concentrations required. Dilution may be carried out, for example, in a stirred tank.

In addition, the quantities of water used for washing may be reduced by operating the centrifuges on the countercurrent principle. To this end, the water removed from the n+1th centrifuge Z(n+1) (n=integer of 1 to 5) may be introduced into the mixing chamber of the n-1th centrifuge Z(n-1) acidic and alkaline wastewaters being kept separate from one another. It is possible in this way to reduce the number of water additions.

It may be of advantage to mix hydrochloric acid with a proportion of phosphoric acid. It is important in this regard to bear in mind the fact that, in general, the concentration of the acid should be below 2% where 1.4571 is used as the material.

In centrifuge Z3, water is added in such quantities that, by virtue of step 2 according to the invention, the wastewater still has a pH value of 2.0 to 5.5 in the outflow of centrifuge Z3.

In addition to centrifuges, separation vessels of adequate dimensions (gravity separators) may be used for phase separation of the two-phase interfacial emulsion. To accelerate separation, these separation vessels may also be operated under pressure (up to 10 bar) and slightly higher temperatures (between 30° and 60° C.).

It can be of advantage to intercept disturbances in the washing process by using centrifuges for phase separation. Centrifuges will always preferably be used for separation when the emulsion to be separated only separates with difficulty in gravity separators.

The organic solutions delivered to the washing process generally have concentrations of 3 to 25 parts by weight polymer to 97 to 75 parts by weight solvent. Preferred concentration ranges are 10 to 25 parts by weight polymer to 90 to 75 parts by weight solvent, separation ranges of 12 to 18 parts by weight polymer to 88 to 82 parts by weight solvent being particularly preferred.

The temperature of the organic solution to be washed is generally between 15° and 55° C. and preferably between 20° and 45° C.

In the process according to the invention, most of the catalyst is removed from the organic phase after the first acidic washing stage (step 2) Through the special dosage of the hydrochloric acid and the quantity of water, the catalyst is, surprisingly, completely removed in the following second washing stage, irrespective of the method by which the aqueous acid is mixed into the organic phase. Accordingly, a number of known mixing units, such as for example static mixers, stirred vessels, rotary pumps, and also the mixing chamber of the centrifuge may be used for this mixing step. The residence time which the organic solution is allowed after mixing is also variable within wide limits, generally between a few milliseconds and 60 minutes. Accordingly, the process according to the invention may be used for various applications, depending on the associated equipment.

The process according to the invention enables the catalysts to be completely extracted, saves washing stages through the special dosage control of the hydrochloric acid and provides for particularly efficient washing of high molecular weight, heat-resistant polycarbonates.

The invention is further illustrated but is not intended to be limited by the following examples in which all parts and percentages are by weight unless otherwise specified.

EXAMPLES ACCORDING TO THE INVENTION

Example 1

The reaction mixture is separated in a centrifugal separator (centrifuge) and passes to the centrifuge Z1 ("separator"), in which water is added and alkaline water is removed. In a following stirred tank with a circulation loop incorporating a rotary pump, 30% hydrochloric acid is diluted to 0.7% by addition of water and, mixed with the organic solution, is delivered to the centrifuge Z2 from which acidic wastewater is removed. The organic solution flows to the centrifuge Z3 where water is added. The organic phase then passes through another two centrifuges Z4 and Z5 in which it is washed with water.

The polycarbonate is a polycarbonate based on bisphenol A having a relative viscosity of 1.31, as measured under normal pressure at 25° C. relative to methylene chloride for a solution containing 5 g polymer/liter solvent. In the preceding continuous two-phase interfacial reaction, 8.5 tons/hour bisphenol A are reacted with phosgene. N-Ethyl piperidine was used as catalyst and phenol as chain terminator. The solvent is a mixture of 40 parts monochlorobenzene and 60 parts methylene chloride. 21.0 liter/hour 30% hydrochloric acid flow continuously into the stirred tank. 600 liter/hour water are introduced into the centrifugal separator. 800, 1,000 and 1,140 liter/hour water are introduced into the separators 2, 3 and 4. A residence time of 5 minutes was adjusted in the stirred tank. Product temperature: between 25° and 30° C.

In each washing stage, the sodium content (in ppm), the catalyst content (in ppm) phenol in ppm, the bisphenol content in ppm and also the pH value and percentages by weight water (based on the total weight of the product stream) are determined for the inflowing product streams and the outflowing water and product streams by sampling in the steady state of the continuous washing process averaged over a period of 8 hours. The results obtained are shown in Table I.

TABLE I

| Apparatus part | Results for Example 1 | | | | | | |
|---|---|---|---|---|---|---|---|
|  | H2O | Na | EPP | Phenol | BPA | pH | Cl— |
| Wastewater from separator | n.m. | n.m. | 12 | n.d. | n.d. | 12.7 | 55,000 |
| Product stream to centrifuge Z1 | 0.9 | 34 | 900 | n.d. | n.d. | n.m. | n.m. |
| Wastewater from centrifuge Z1 | n.m. | n.m. | 23 | n.d. | n.d. | 11.2 | 7,000 |
| Product stream from centrifuge Z1 | 0.4 | 17 | 820 | n.d. | n.d. | n.m. | n.m. |
| Wastewater from centrifuge Z2 | n.m. | n.m. | 5,200 | n.d. | n.d. | 1.7 | 2,800 |
| Product stream from centrifuge Z2 | n.m. | <1 | <2 | n.d. | n.d. | n.m. | n.m. |
| Wastewater from centrifuge Z3 | n.m. | n.m. | 88 | n.d. | n.d. | 3.5 | 320 |
| Product stream from centrifuge Z3 | 0.4 | <1 | <2 | n.d. | n.d. | n.m. | n.m. |
| Wastewater from centrifuge Z4 | n.m. | n.m. | n.d. | n.d. | n.d. | n.m. | 46 |
| Product stream from centrifuge Z4 | 0.4 | <1 | <2 | n.d. | n.d. | n.m. | n.m. |
| Wastewater from centrifuge Z5 | n.m. | n.m. | n.d. | n.d. | n.d. | 8.0 | 4 |
| Product stream from centrifuge Z5 | ¯0.3 | <1 | <2 | n.d. | n.d. | n.m. | n.m. |

H2O = water in % by weight of the particular product stream, Na = sodium content in ppm, EPP = N-ethyl piperidine content in ppm, Phenol = phenol content in ppm, BPA = bisphenol A content in ppm, pH = pH value, Cl— = chloride content in ppm, n.d. = not detectable, n.m. = not measured

EXAMPLE 2

The test arrangement is the same as in Example 1, but with the following different parameters:
Product: Polycarbonate based on bisphenol A having a relative viscosity of 1.24; chain terminator isooctyl phenol; quantity of bisphenol A in the two-phase interfacial reaction 15 t/h.
53.4 l/h 30% HCl added to the stirred tank, 660 l/h water added to centrifuge Z1, acid concentration 2.8%, quantity of water in the centrifugal separator 1,250 l/h, quantity of water in centrifuges Z2, Z3, Z4 and Z5 1,675, 800, 990 and 0 l/h, respectively. Residence time in stirred tank 2.3 mins.

The results are shown in Table II.

TABLE II

| Apparatus part | Results for Example 2 | | | | | | |
|---|---|---|---|---|---|---|---|
|  | H2O | Na | EPP | IOP | BPA | pH | Cl— |
| Wastewater from separator | n.m. | n.m. | 8 | n.d. | n.d. | 12.8 | 118,000 |
| Product stream to centrifuge Z1 | 0.5 | 190 | 830 | n.d. | n.d. | n.m. | n.m. |
| Wastewater from centrifuge Z1 | n.m. | n.m. | 26 | n.d. | n.d. | 12.2 | 12,000 |
| Product stream from centrifuge Z1 | 0.6 | <1 | 870 | n.d. | n.d. | n.m. | n.m. |
| Wastewater from centrifuge Z2 | n.m. | n.m. | 43,000 | n.d. | n.d. | 0.6 | 45,000 |
| Product stream from centrifuge Z2 | n.m. | <1 | 6 | n.d. | n.d. | n.m. | n.m. |
| Wastewater from centrifuge Z3 | n.m. | n.m. | 73 | n.d. | n.d. | 3.0 | 285 |
| Product stream from centrifuge Z3 | 0.2 | <1 | <2 | n.d. | n.d. | n.m. | n.m. |
| Wastewater from centrifuge Z4 | n.m. | n.m. | <5 | n.d. | n.d. | n.m. | 3 |
| Product stream from centrifuge Z4 | 0.2 | <1 | <2 | n.d. | n.d. | n.m. | n.m. |

H2O = water in % by weight of the particular product stream, Na = sodium content in ppm, EPP = N-ethyl piperidine content in ppm, IOP = IOP content in ppm, BPA = bisphenol A content in ppm, pH = pH value, Cl— = chloride content in ppm, n.d. = not detectable, n.m. = not measured

EXAMPLE 3

As in Example 1, but with the following changes:
Product: polycarbonate based on bisphenol A having a relative viscosity of 1.28; chain terminator phenol; quantity of bisphenol A 6 t/h
17/8 l/h 30% HCl, addition of 565 l/h water to 21, acid concentration 1.1%, addition of 1,000 l/h water to centrifugal separator and 940, 1,040 and 1,230 l/h water to centrifuges 22, 23, 24. Another 960 l/h water is added before separator 21. The stirred tank is "short-circuited", i.e. bypassed by a pipe.

The results are shown in Table III.

TABLE III

| Apparatus part | Results for Example 3 | | | | | | |
|---|---|---|---|---|---|---|---|
| | H2O | Na | EPP | Phenol | BPA | pH | Cl— |
| Wastewater from centrifuge Z2 | n.m. | n.m. | 6,700 | n.m. | n.d. | 0.9 | 1,700 |
| Product stream from centrifuge Z2 | 0.5 | <1 | 5 | 6 | n.d. | n.m. | n.m. |
| Wastewater from centrifuge Z3 | n.m. | n.m. | 50 | n.m. | n.d. | 3.5 | 269 |
| Product stream from centrifuge Z3 | 0.3 | <1 | <2 | 6 | n.d. | n.m. | n.m. |

H2O = water in % by weight of the particular product stream, Na = sodium content in ppm, EPP = N-ethyl piperidine content in ppm, Phenol = phenol content in ppm, BPA = bisphenol A content in ppm, pH = pH value, Cl = chloride content in ppm, n.d. = not detectable, n.m. — not measured

EXAMPLE 4

As Example 3, but with the following changes: addition of 940 l/h water to 21, acid concentration 0.8%, 1,125, 1,040, 1,230 l/h water added to separators 22, 23 and 24. Residence time in the stirred tank 2 mins.

The results are shown in Table IV.

TABLE IV

| Apparatus part | Results for Example 4 | | | | | | |
|---|---|---|---|---|---|---|---|
| | H2O | Na | EPP | Phenol | BPA | pH | Cl— |
| Wastewater from separator | n.m. | n.m. | 8 | n.d. | n.d. | 12.4 | 15.3% |
| Product stream to centrifuge Z1 | 1.9 | n.m. | 900 | 15 | 2 | n.m. | n.m. |
| Wastewater from centrifuge Z1 | n.m. | n.m. | 30 | 8 | 1 | 11.3 | 11,700 |
| Product stream from centrifuge Z1 | 0.5 | <1 | 900 | 13 | 1 | n.m. | n.m. |
| Wastewater from centrifuge Z2 | n.m. | n.m. | 5,300 | n.d. | n.d. | 1.1 | 4,600 |
| Product stream from centrifuge Z2 | 0.8 | <1 | 4 | 6 | n.d. | n.m. | n.m. |
| Wastewater from centrifuge Z3 | n.m. | n.m. | 50 | n.d. | n.d. | 3.3 | 40 |

H2O = water in % by water of the particular product stream, Na = sodium content in ppm, EPP = N-ethyl piperidine content in ppm, Phenol = phenol content in ppm, BPA = bisphenol A content in ppm, pH = pH value. Cl— = chloride content in ppm, n.d. = not detectable, n.m. = not measured.

EXAMPLE 5

As Example 4, but with the following changes: addition of 1.9 l/h 70% phosphoric acid together with 19.8 l/h 30% HCl to the stirred tank and 825 l/h water to centrifuge 1. 500 l/h water are added to the centrifugal separator. Another 830 l/h are added before Z1 so that an acid concentration of 0.99% is established. 950, 1,120 and 1,170 l/h water are added to 22, 23 and 24. The residence time in the stirred tank is 5 minutes.

The results are shown in Table V.

TABLE V

| Apparatus part | Results for Example 5 | | | | | | |
|---|---|---|---|---|---|---|---|
| | H2O | Na | EPP | Phenol | BPA | pH | Cl— |
| Wastewater from separator | n.m. | n.m. | 10 | 159 | 16 | 12.7 | 17.5% |
| Product stream to centrifuge Z1 | n.m. | n.m. | 1,000 | 5 | 1 | n.m. | n.m. |
| Wastewater from centrifuge Z1 | n.m. | n.m. | 35 | 11 | 3 | 11.6 | 4,900 |
| Product stream from centrifuge Z1 | 0.3 | <1 | 1,100 | 5 | n.d. | n.m. | n.m. |
| Wastewater from centrifuge Z2 | n.m. | n.m. | 8,200 | n.d. | n.d. | 1.0 | 5,300 |
| Product stream from centrifuge Z2 | n.m. | <1 | 10 | n.d. | n.d. | n.m. | n.m. |
| Wastewater from centrifuge Z3 | n.m. | n.m. | 80 | n.d. | n.d. | 3.1 | 65 |

H2O = water in % by weight of the particular product stream, Na = sodium content in ppm, EPP = N-ethyl piperidine content in ppm, Phenol = phenol content in ppm, BPA = bisphenol A content in ppm, pH = pH value, Cl— = chloride content in ppm, n.d. = not detectable, n.m. = not measured All the tests (Examples 1-5) were carried out over a relatively long period (a few weeks). Samples of the washed organic solution were taken during the tests and were worked up by precipitation with iso-octane. In every case, the iron content of the polycarbonate, as measured with a Contron ES 750 inductively coupled plasma spectrometer, was lower than 0.1 ppm.

What is claimed is:

1. A continuous process for the removal of electrolytes and catalysts from organic polycarbonate solution comprising (i) introducing said solution into a first centrifuge, Z1, in a cascading train of centrifuges, separating the solution by centrifugation into a organic solution Z1 and an aqueous phase and removing the thus separated aqueous phase having a pH value of 9 to 13 as the outflow of Z1, and (ii) introducing said organic solution Z1 to a next centrifuge, Z2, of said train, washing said solution Z1 with an amount of hydrochloric acid having a concentration of 0.01 to 2 weight-%, and separating by centrifugation the thus washed organic solution into wastewater Z2 and organic solution Z2, said amount being sufficient to cause the wastewater Z2 to have a pH value of about 0.5 to 3, and removing said wastewater Z2 as the outflow of centrifuge Z2, and (iii) introducing said organic solution Z2 and added water to a next centrifuge, Z3, of said train and washing said organic solution Z2 and separating by centrifugation the thus washed organic solution Z2, into wastewater Z3 and organic solution Z3 and removing said wastewater Z3 as an outflow of centrifuge Z3, said added water being of such amount that said wastewater Z3 has a pH value of 2.0 to 5.5, said organic polycarbonate solution being obtained from the two-phase interfacial reaction for the preparation of polycarbonate resins and containing about 3 to 25 parts of a thermoplastic polycarbonate, 97 to 75 parts of an organic solvent, and up to 10 parts water having a pH value of 5 to 15 and residues of chain terminators, branching agents, diphenol, said parts are by weight and the total parts by weight of a) and b) and c) adding up to 100 parts by weight.

2. The process of claim 1 comprising separating in said (i) with the addition of aqueous sodium hydroxide solution.

3. The process of claim 1 wherein washed organic solution Z1 is washed with water in a centrifuge before said (ii).

4. The process of claim 1 further comprising introducing said organic solution Z3 to a next centrifuge Z4, washing and separating by centrifugation the thus washed solution into waste water Z4 and organic solution Z4.

5. The process of claim 4 further comprising introducing said organic solution Z4 to a next centrifuge Z5, washing and separating by centrifugation the thus washed solution into waste water Z5 and organic solution Z5.

6. The process of claim 5 further comprising introducing said organic solution Z5 to a next centrifuge Z6, washing and separating by centrifugation the thus washed solution into waste water Z6 and organic solution Z6.

* * * * *